United States Patent
Ko et al.

(10) Patent No.: US 9,401,514 B2
(45) Date of Patent: Jul. 26, 2016

(54) FUEL CELL SEPARATOR AND METHOD FOR SURFACE TREATMENT OF THE SAME

(75) Inventors: Haeng Jin Ko, Seoul (KR); Sae Hoon Kim, Gyeonggi-do (KR); Yoo Chang Yang, Gyeonggi-do (KR); Yun Seok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1171 days.

(21) Appl. No.: 13/106,232

(22) Filed: May 12, 2011

(65) Prior Publication Data

US 2012/0122018 A1 May 17, 2012

(30) Foreign Application Priority Data

Nov. 17, 2010 (KR) ........................ 10-2010-0114639

(51) Int. Cl.
*H01M 8/02* (2006.01)
*H01M 8/04* (2016.01)
*H01M 8/10* (2016.01)

(52) U.S. Cl.
CPC .............. *H01M 8/0228* (2013.01); *H01M 8/02* (2013.01); *H01M 8/0245* (2013.01); *H01M 8/04156* (2013.01); *H01M 2008/1095* (2013.01); *H01M 2250/20* (2013.01); *Y02E 60/50* (2013.01); *Y02T 90/32* (2013.01)

(58) Field of Classification Search
CPC .... H01M 8/02; H01M 8/0228; H01M 8/0245
USPC ........................................................ 429/514
See application file for complete search history.

(56) References Cited

U.S. PATENT DOCUMENTS 6,407,382 B1 * 6/2002 Spangler ....................... 250/286
6,472,632 B1 * 10/2002 Peterson et al. ......... 219/121.59

(Continued)

FOREIGN PATENT DOCUMENTS

JP 60-115173 6/1985
JP 2000260441 9/2000

(Continued)

OTHER PUBLICATIONS

Suh et al. Highly charging of nanoparticles through electrospray of nanoparticle suspension. Journal of Colloid and Interface Science, vol. 287, 2005, pp. 135-140 [online], [retrieved on Jun. 9, 2015]. Retrieved from the Internet <URL: http://www.sciencedirect.com/science/article/pii/S0021979705000883>.*

(Continued)

*Primary Examiner* — Basia Ridley
*Assistant Examiner* — James Erwin
(74) *Attorney, Agent, or Firm* — Mintz Levin Cohn Ferris Glovsky and Popeo, P.C.; Peter F. Corless

(57) ABSTRACT

The present invention provides a fuel cell separator and a method for surface treatment of the same, in which ionized nanoparticles are attached to the surface of a separator to form fine projections such that the surface of the separator exhibits superhydrophobicity. For this purpose, the present invention provides a method for surface treatment of a fuel cell separator which provides nanoparticles for forming fine projections on the surface of the separator to a discharge electrode and ionizes the nanoparticles by an arc discharge generated in the discharge electrode. The ionized nanoparticles are then attached to the surface of the separator by an electric field generated by applying a high voltage between the separator and the discharge electrode, thereby forming fine projections for imparting superhydrophobicity.

4 Claims, 4 Drawing Sheets

(56) References Cited

U.S. PATENT DOCUMENTS

| | | | |
|---|---|---|---|
| 2002/0018923 A1* | 2/2002 | Kawahara | 429/26 |
| 2003/0156435 A1* | 8/2003 | Morimoto et al. | 363/21.01 |
| 2005/0123687 A1* | 6/2005 | Jacobs et al. | 427/457 |
| 2006/0029808 A1* | 2/2006 | Zhai et al. | 428/412 |
| 2009/0092874 A1* | 4/2009 | Abd Elhamid et al. | 429/30 |

FOREIGN PATENT DOCUMENTS

| | | |
|---|---|---|
| JP | 2007157483 | 6/2007 |
| KR | 10-2003-0034109 | 5/2003 |
| KR | 10-2005-0113697 | 12/2005 |

OTHER PUBLICATIONS

Deng et al. Increase of electrospray throughput using multiplexed microfabricated sources for the scalable generation of monodisperse droplets. Aerosol Science, vol. 37, 2006, pp. 696-714 140 [online], [retrieved on Jun. 9, 2015]. Retrieved from the Internet <URL: http://www.sciencedirect.com/science/article/pii/S0021850205000959#>.*

* cited by examiner

US 9,401,514 B2

FUEL CELL SEPARATOR AND METHOD FOR SURFACE TREATMENT OF THE SAME

CROSS-REFERENCE TO RELATED APPLICATION

This application claims under 35 U.S.C. §119(a) the benefit of Korean Patent Application No. 10-2010-0114639 filed Nov. 17, 2010, the entire contents of which are incorporated herein by reference.

BACKGROUND (a) Technical Field

The present invention relates to a fuel cell separator and a method for surface treatment of the same. More particularly, it relates to a fuel cell separator and a method for surface treatment of the same, in which ionized nanoparticles are attached to the surface of a separator to form fine projections such that the surface of the separator exhibits superhydrophobicity.

(b) Background Art

A typical polymer electrolyte membrane fuel cell (PEMFC) can generate electricity with heat and water by an electrochemical reaction between hydrogen and oxygen as reactant gases. The PEMFC has various advantages such as high energy efficiency, high current density, high power density, short start-up time, and rapid response to a load change as compared to the other types of fuel cells. For these reasons, it can be used in various applications such as a power source for zero-emission vehicles, an independent power plant, a portable power source, a military power source, etc.

The configuration of a fuel cell stack will be briefly described below. In a typical fuel cell stack, a membrane-electrode assembly (MEA) is positioned in the center of each unit cell of the fuel cell stack. The MEA comprises a polymer electrolyte membrane, through which hydrogen ions (protons) are transported, and an electrode/catalyst layer such as an air electrode (cathode) and a fuel electrode (anode), in which an electrochemical reaction between hydrogen and oxygen takes place, disposed on each of both sides of the polymer electrolyte membrane.

Moreover, a gas diffusion layer (GDL) and a gasket are sequentially stacked on both sides of the MEA, where the cathode and the anode are located. A separator including flow fields for supplying fuel and discharging water produced by the reaction is located on the outside of the GDL, and an end plate for supporting the above-described components is connected to the outermost ends.

Therefore, at the anode of the fuel cell stack, hydrogen is dissociated into hydrogen ions (protons, H+) and electrons (e−) by an oxidation reaction of hydrogen. The hydrogen ions and electrons are transmitted to the cathode through the electrolyte membrane and the separator, respectively. At the cathode, water is produced by the electrochemical reaction in which the hydrogen ions and electrons transmitted from the anode and the oxygen in air participate and, at the same time, electrical energy is produced by the flow of electrons is supplied to a load requiring the electrical energy through a current collector of an end plate.

Meanwhile, the separator has a land as a flat portion being in direct contact with the GDL and a channel 24 as a space between the lands, through which hydrogen and air (oxygen) passes. The separator functions to supply reactant gases such as hydrogen and air, remove water produced at the cathode from the GDL, and transmit electricity to an external circuit.

The types of the separators are divided into a graphite separator formed by a mechanical process and a metal separator formed by a stamping process. The channel may have a rectangular cross-section or a trapezoidal cross-section. The surface of each channel is smooth, and thus the actual flow of reactant gases has laminar flow characteristics.

However, laminar flow is a flow where the flow velocity at the wall is smaller than that at the center of the channel, and thus a smooth film flow of water droplets cannot be ensured. This makes it difficult to remove the water trapped in pores of the GDL.

Various methods for solving these problems have been proposed, including Korean Patent Application Publication No. 2010-0088346, U.S. Pat. No. 7,250,189, U.S. Patent Publication No. 2010/0035091, U.S. Pat. No. 6,730,238, etc.

First, FIG. 4 refers to Korean Patent Application Publication No. 2010-0088346 discloses a method for forming a CrN—CH thin film on a metal separator for a proton exchange membrane fuel cell and a product thereof. Specifically, a pretreatment process, controlled by circuit board 110, supplies a reactant gas, via gas input device 420, to the inside of a chamber 400 to pre-treat the surface of a substrate 100, and an arc discharge process, executed by an arch device 430, supplies a reactant gas to the inside of the chamber 400 to generate an arc discharge and, at the same time, collects electrons of a Cr target induced by the arc discharge in an anode 440 to accelerate the decomposition of reactants in the chamber 400. Furthermore, a coating process feeds a carbon compound and $N_2$ as reactants into the chamber and, at the same time, applies a bias voltage to the substrate 100 such that the reactants decomposed by the arc discharge are adsorbed to the surface of the substrate 100 and metal ions emitted from the Cr target are contained in the substrate, thus forming a conductive and corrosion resistant thin film on the substrate. Furthermore, a shielding membrane 435 is provided in between the arc device 430 and the substrate 100. For example, the shielding membrane 435, fixed onto the center of the upper end of chamber 400, is transported in an up-and-down motion, or is rotatable horizontally.

According to this method, a corrosion resistant conductive film having high coating uniformity is formed on the separator by vacuum plasma. However, a wetting angle of water droplets is an intermediate angle of 90 to 110, and thus it is difficult to remove the water droplets flowing through channels. Moreover, it requires an expensive vacuum chamber and high purity reactant gas supply equipment, and the output and quality of the separators may be limited according to the size of the vacuum chamber.

U.S. Pat. No. 7,250,189 discloses an electroconductive porous substrate such as carbon fibers with an electroconductive polymer deposited on the carbon fibers, in which the polymer is deposited from a solution of monomers by electrochemical polymerization. However, the electrochemical polymerization is sensitive to the concentration of monomers in the substrate and the solution of monomers, and thus it is difficult to obtain uniform coating on the substrate.

U.S. Patent Application Publication No. 2010/0035091 and U.S. Pat. No. 6,730,238 disclose methods for pre-treating a carbon substrate having a coating with active groups. In particular, a polymer, including ionic or polar groups, is grafted onto the substrate by reaction with the active groups, and polymer functional groups or hydrophilic functional groups are attached to the surface of the substrate. However, the coating is formed depending on the types of gases used in the processes, and thus the types of usable gases are limited. Moreover, in the case of a metal separator having a thickness of 0.1 mm or less, there may be defects such as holes when corrosion occurs due to plasma.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a fuel cell separator and a method for surface treatment of the same, in which ionized nanoparticles are attached to the surface of a separator using a high voltage generated by an intermittent current to form fine projections for imparting hydrophobicity, thereby improving the effect of removing water droplets from a fuel cell.

In one aspect, the present invention provides a method for surface treatment of a fuel cell separator. In particular, the method provides nanoparticles that form fine projections on the surface of the separator to a discharge electrode. The nanoparticles are ionized by an arc to discharge generated in the discharge electrode and the ionized nanoparticles are then attached to the surface of the separator by an electric field generated by applying a high voltage between the separator and the discharge electrode. Thus, fine projections for imparting superhydrophobicity are formed.

In one embodiment, the arc discharge is generated in the discharge electrode by turning on a switch for controlling current stored in a capacitor and a DC power supply, which are connected to the discharge electrode, such that a high voltage is momentarily induced and applied to the discharge electrode.

In another embodiment, the nanoparticles are provided to the discharge electrode by rotating a fan for blowing the nanoparticles in a predetermined direction to blow the nanoparticles to the discharge electrode.

In still another embodiment, the nanoparticles are provided to the discharge electrode by applying ultrasonic vibration to a colloid solution by an ultrasonic generator to be evaporated to the discharge electrode.

In another aspect, the present invention provides a fuel cell separator whose surface is treated by the method for surface treatment of the present invention.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
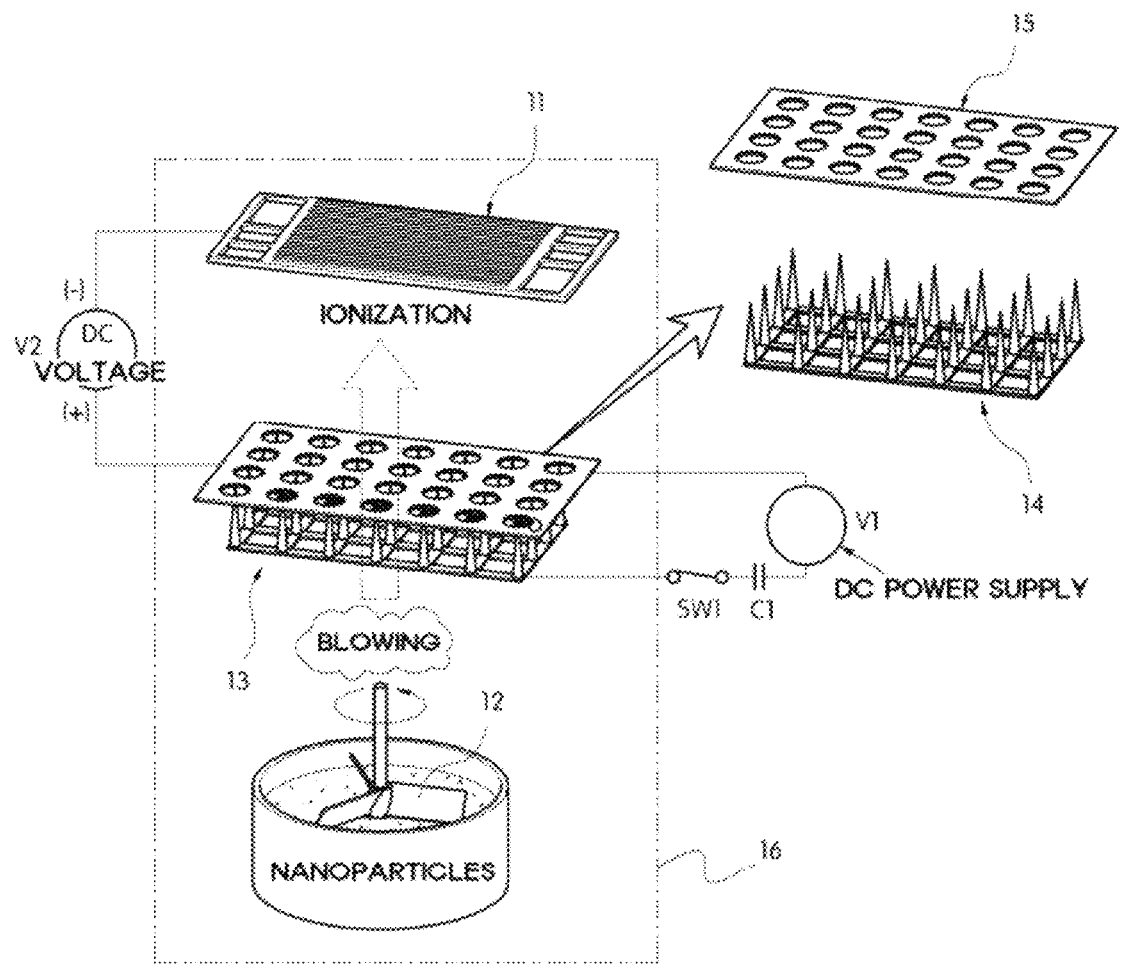
FIG. 1 is a schematic diagram showing a method for surface treatment of a separator in accordance with an exemplary embodiment of the present invention.

Reference numerals set forth in the Drawings includes reference to the following elements as further discussed below:

11: separator;
12: blowing mechanism;
13: discharge electrode;
14: probe;
15: electrode;
16: chamber;
17: ultrasonic generator;
100: substrate;
110: circuit board;
400: chamber;
420: gas input device;
430: arc gun;
435: shielding membrane;
440: anode.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and to described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention provides a fuel cell separator and a method for surface treatment of the same, in which nanoscale projections are formed on the surface of a fuel cell separator to create a lotus effect (superhydrophobicity) such that water droplets are effectively removed from a fuel cell.

For this purpose, ultrafine nanoparticles are provided to a discharge electrode 13 to form fine projections on the surface of a separator 11.

In one embodiment of the present invention, as shown in FIG. 1, a blowing mechanism (e.g., fan) 12 for blowing nanoparticles contained in a container in a predetermined direction is rotated to blow the nanoparticles to the discharge electrode 13 and, at the same time, an arc discharge is generated in the discharge electrode 13 to ionize the nanoparticles passing through the discharge electrode 13.

The discharge electrode 13 has a plurality of pointed probes 14 and a plate-shaped electrode 15 including a plurality of circular openings. A DC power supply V1, a capacitor C1, and a switch SW1 for controlling current are connected in series to the discharge electrode 13 to generate the arc discharge.

When the switch SW1 is turned on in a state where power supply to the discharge electrode 13 is cut off as the switch SW1 is turned off, the current stored in the capacitor C1 and the DC power supply V1 is suddenly supplied to the discharge electrode 13 such that a high voltage is momentarily induced and applied to the discharge electrode 13, thereby generating the arc discharge between the probes 14 and the plate-shaped electrode 15.

Here, the capacitor C1 is maintained in a fully charged state by the DC power supply V1 until the switch SW1 is turned on. As such, the arc discharge is generated in the discharge electrode 13, and the nanoparticles are passed to the discharge electrode 13 and ionized, thereby generating charged nanoparticles. The thus generated charged nanoparticles (or ionized nanoparticles) are attached to the surface of the separator 11 to form fine projections capable of imparting superhydrophobicity.

For this purpose, as shown in FIG. 1, a high DC voltage is applied from a DC power supply V2 between the separator 11, on which the fine projections are to be formed, and the discharge electrode 13. Then, the charged nanoparticles are generated by the strong force of an electric field generated by the applied high voltage and then attached to the surface of the separator 11, thus forming the fine projections for imparting superhydrophobicity.

As such, the method for surface treatment of the present invention does not use a high purity reactant gas for generating plasma, but ionizes the nanoparticles by the high voltage discharge and attaches the charged nanoparticles to the surface of the separator 11. Therefore, the method for surface treatment of the present invention can be performed in a chamber 16 at room temperature and atmospheric pressure.

Figure 2:
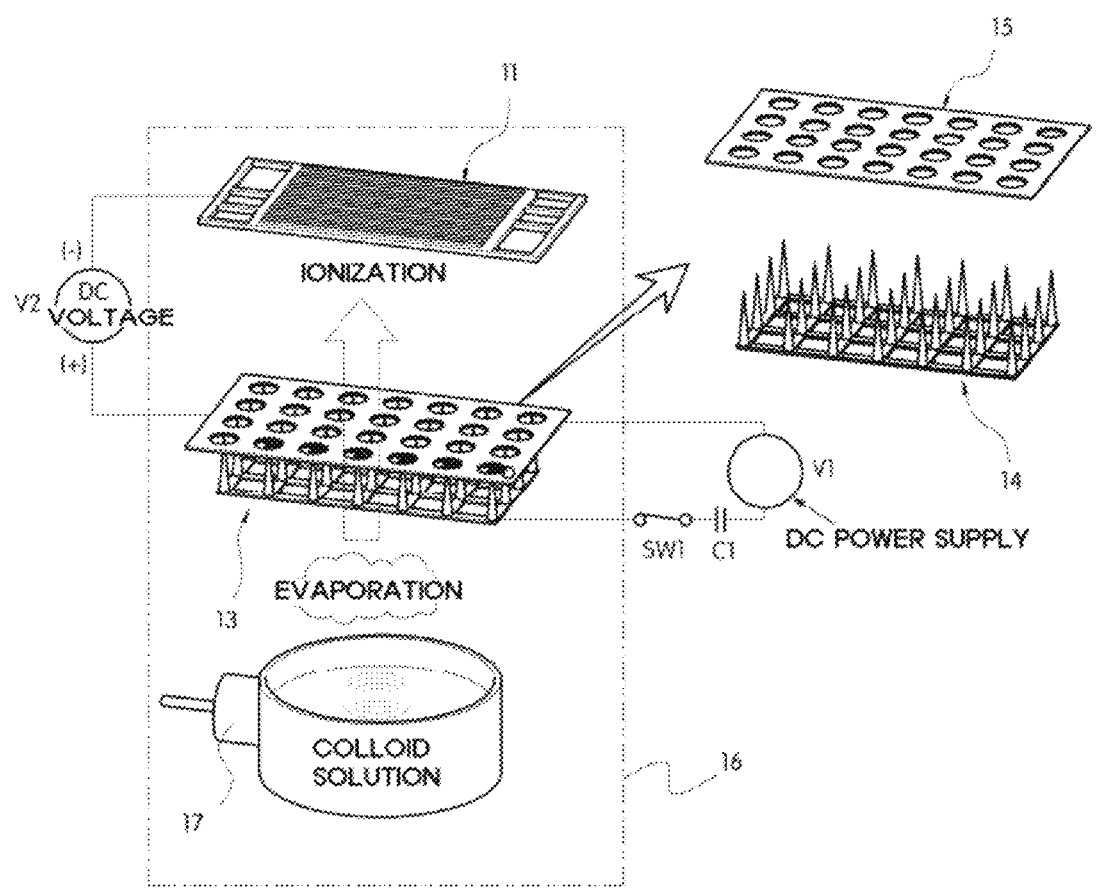
FIG. 2 is a schematic diagram showing a method for surface treatment of a separator in accordance with another exemplary embodiment of the present invention.

Meanwhile, in another embodiment of the present invention, a hydrophilic colloid solution may be used to provide nanoparticles for forming fine projections on the surface of a separator 11. For this purpose, as shown in FIG. 2, ultrasonic vibration is applied to a colloid solution contained in a container in a chamber 16 at room temperature and atmospheric pressure by an ultrasonic generator 17 to be evaporated. When the evaporated colloid solution is provided to a discharge electrode 13 at the top of the ultrasonic generator 17, a switch SW1 for controlling current is turned on such that a high voltage is momentarily induced and applied to the discharge electrode 13 by the current stored in a capacitor C1 and a DC power supply V1 to generate an arc discharge, and thus the evaporated colloid solution is ionized to generate charged colloid nanoparticles. The thus generated charged colloid nanoparticles are strongly attached to the surface of the separator 11 by a high voltage electric field applied between the separator 11 and the discharge electrode 13, thereby forming fine projections on the surface of the separator 11.

In other words, the charged nanoparticles are generated by the strong electric field (i.e., electric force) due to the high voltage applied between the separator 11 and the discharge electrode 13 and then attached to the surface of the separator 11, thus forming the fine projections for imparting superhydrophobicity.

Figure 3A:
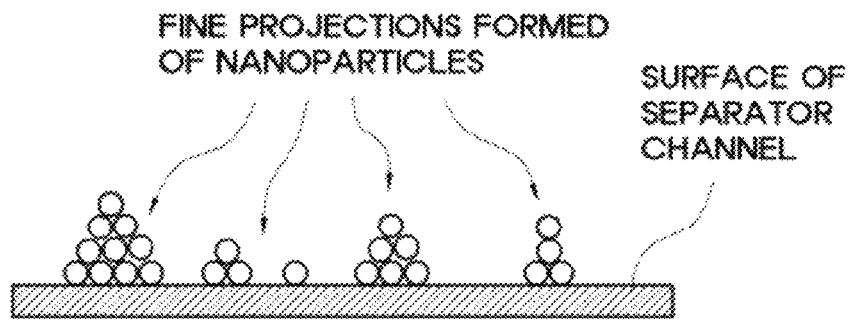
FIG. 3A is a schematic diagram showing fine projections formed on the surface of a separator channel by the illustrative method for surface treatment of the present invention.
Figure 3B:
FIG. 3B is an image showing fine projections formed on the surface of a separator by the illustrative method for surface treatment of the present invention.
Figure 4:
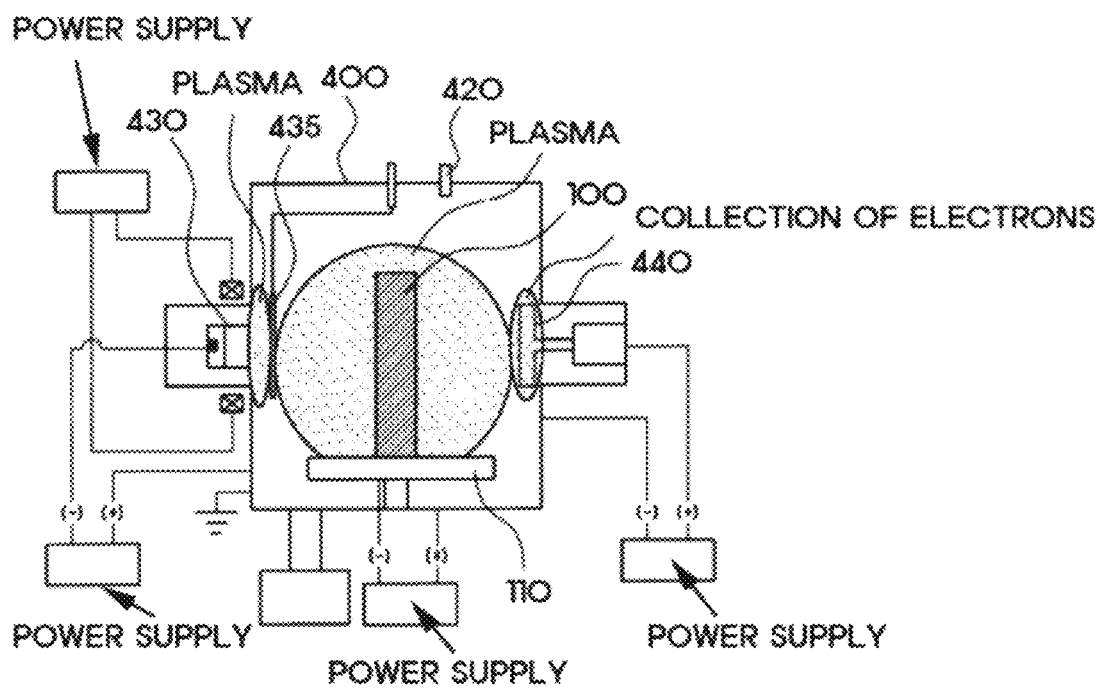
FIG. 4 is a schematic diagram showing conventional method for surface treatment of fuel cell separators.

FIG. 3A is a schematic diagram showing the fine projections formed on the surface of the separator channel by the method for surface treatment of the present invention, and FIG. 3B is an image showing the fine projections formed on the surface of the separator by the method for surface treatment of the present invention.

As such, according to the present invention, the nanoparticles are ionized by the arc discharge generated by the high voltage induced by the intermittent current, and the ionized nanoparticles are attached to the surface of the separator by the electric field generated around separator to form the fine projections for imparting superhydrophobicity, thereby improving the effect of removing water droplets from the fuel cell.

In other words, the fine projections having a concave-convex structure are formed on the surface of the separator channel by the method for surface treatment of the present invention to exhibit a lotus effect in which the water droplets are not spread on the surface of the separator channel but remain as water droplets. As a result, the flow of water droplets is to facilitated, and thus it possible to effectively remove the water trapped in pores of a gas diffusion layer (GDL).

Therefore, according to the fuel cell separator formed by the method for surface treatment of the present invention, it is possible to easily remove the water droplets from the separator channel by blowing mechanism, and it is possible to mass produce large area separators via a simple process.

Moreover, the manufacturing process involved in the conventional surface treatment methods is complicated due to the vacuum process and atmospheric plasma which uses a high purity reactant gas. Additionally, vacuum plasma equipment used in the process also increases the manufacturing cost. However, according to the method for surface treatment of the present invention, it is possible to facilitate the removal of water droplets from the fuel cell by an inexpensive and simple process of ionizing the nanoparticles by the arc discharge and the electric field and attaching the ionized nanoparticles to the surface of the separator.

Advantageously, the method for surface treatment of the present invention imparts superhydrophobicity to the separator channel by forming the fine projection on the surface of the separator, instead of attaching hydrophilic functional groups to the surface of the separator to control the hydrophilic and hydrophobic properties, thus improving the effect of removing water droplets from the fuel cell.

While the conventional process is complicated and expensive, the method of the present invention can achieve a lotus effect via an inexpensive and simple process of ionizing the nanoparticles by the arc discharge and the electric field and attaching the ionized nanoparticles to the surface of the separator. Moreover, it is possible to eliminate the complicated process of supplying and controlling a high purity gas while at the same time reducing the manufacturing cost.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for surface treatment of a fuel cell separator, the method comprising:
   providing nanoparticles for forming fine projections on the surface of the separator to a discharge electrode, the discharge electrode having a first plate-shaped electrode including a plurality of pointed probes and a plurality of openings formed between each of the pointed probes and a second plate-shaped electrode including a plurality of circular openings;

ionizing the nanoparticles passing through the discharge electrode via the plurality of openings formed between each of the pointed probes of the first plate-shaped electrode and the plurality of circular openings of the second plate-shaped electrode by an arc discharge that is generated by applying a first voltage between the pointed probes of the first plate-shaped electrode and the second plate-shaped electrode; and attaching the ionized nanoparticles to the surface of the separator by an electric field generated by applying a second voltage between the separator and the discharge electrode, thereby forming fine projections for imparting superhydrophobicity.

2. The method of claim 1, wherein the arc discharge is generated in the discharge electrode by turning on a switch for controlling current stored in a capacitor and a DC power supply, which are connected to the discharge electrode, such that a high voltage is momentarily induced and applied to the discharge electrode.

3. The method of claim 1, wherein the nanoparticles are provided to the discharge electrode by rotating a fan for blowing the nanoparticles in a predetermined direction to blow the nanoparticles to the discharge electrode.

4. The method of claim 1, wherein the nanoparticles are provided to the discharge electrode by applying ultrasonic vibration to a colloid solution by an ultrasonic generator to be evaporated to the discharge electrode.

* * * * *